US008330029B2

(12) United States Patent
Dunlop

(10) Patent No.: US 8,330,029 B2
(45) Date of Patent: Dec. 11, 2012

(54) ENHANCED GRIPPING SURFACE FOR USE WITH PLECTRA AND OTHER HAND-HELD IMPLEMENTS

(75) Inventor: James Andrew Dunlop, Benecia, CA (US)

(73) Assignee: Dunlop Manufacturing, Inc., Benicia, CA (US)

( * ) Notice: Subject to any disclaimer, the term of this patent is extended or adjusted under 35 U.S.C. 154(b) by 509 days.

(21) Appl. No.: 12/571,799

(22) Filed: Oct. 1, 2009

(65) Prior Publication Data

US 2011/0081523 A1 Apr. 7, 2011

(51) Int. Cl.

| | |
|---|---|
| ***G10D 3/16*** | (2006.01) |
| *G10D 3/00* | (2006.01) |
| *B32B 3/30* | (2006.01) |
| *A63B 53/14* | (2006.01) |
| *A63B 49/08* | (2006.01) |
| *A43B 13/22* | (2006.01) |

(52) U.S. Cl. ................ 84/320; 84/321; 84/322; 84/315; 84/316; 84/317; 84/453; 428/141; 428/147; 428/167; 428/169; 36/59 R; 36/59 C; 36/67 A; 36/67 R; 473/300; 473/538; 473/549; 473/568; 473/596; D17/20; D17/99; D2/948; D2/951; D2/952; D8/303; D8/305; D21/682; D21/756; D21/757; D21/758; D21/770

(58) Field of Classification Search .................... 84/320, 84/321, 322, 453, 315, 316, 317; D17/20, D17/99; 428/141, 147, 167, 169; D2/948, D2/951, 952, 957, 959; D8/68, 303, 305, D8/315; 36/59 R, 59 C, 67 A, 67 R; D3/12; D29/117.2; D21/682, 756, 757, 758, 770; 482/49; 473/596, 549, 538, 201, 300, 568

See application file for complete search history.

(56) References Cited

U.S. PATENT DOCUMENTS

| | | | | | |
|---|---|---|---|---|---|
| 1,355,827 | A | * | 10/1920 | Finneran | 36/59 R |
| D95,158 | S | * | 4/1935 | Surerus | D25/158 |
| 2,801,613 | A | * | 8/1957 | Gigli | 401/93 |
| 4,571,852 | A | * | 2/1986 | Lamarche et al. | 36/32 R |
| D316,476 | S | * | 4/1991 | Brinker | D2/959 |
| D341,024 | S | * | 11/1993 | Peterson | D2/955 |
| 5,491,015 | A | * | 2/1996 | Reeves et al. | 428/167 |
| 6,079,509 | A | * | 6/2000 | Bee et al. | 175/423 |
| D460,247 | S | * | 7/2002 | Liu et al. | D2/952 |
| 2002/0108483 | A1 | * | 8/2002 | Smith | 84/322 |
| 2006/0081109 | A1 | * | 4/2006 | James | 84/322 |

* cited by examiner

*Primary Examiner* — David Sample
*Assistant Examiner* — Kendra Keith
(74) *Attorney, Agent, or Firm* — West & Associates, A PC; Stuart J. West; Shaun Sluman

(57) ABSTRACT

A textured surface for improving grip on plectra and other hand-held implements. A series of parallel ridges serve to frictionally engage thumb and forefinger surfaces and "lock" the grip in place.

7 Claims, 8 Drawing Sheets

ENHANCED GRIPPING SURFACE FOR USE WITH PLECTRA AND OTHER HAND-HELD IMPLEMENTS

BACKGROUND

1. Field of the Invention

The present disclosure relates to the field of handheld implements, particularly plectra.

2. Background

Many implements are held in a thumb-forefinger grip, such as plectra, tools, writing instruments, and medical instruments. The force to hold the implement is provided by the pressure of the thumb and forefinger, as well as the frictional interaction between the skin and the implement surface. Sometimes it is desirable to be able to maintain a firm grip without applying excessive pressure. Also, it may be difficult to maintain a firm grip under certain conditions, such as when moisture is present.

In the case of plectra, or picks, a musician typically holds a pick such that the planar surface rests between the pad of the thumb and the pad or edge of the index finger. It is important to hold the pick firmly enough so that it does not fall out of the hand while playing. However, the hand holding the pick (the "strumming" hand) must also remain relaxed enough in order to effectively pluck the strings with the pick.

When playing, perspiration or other factors can diminish a musician's grip on a pick. Current picks use a variety of techniques to increase the friction between the pick and the fingers. For example, some picks have textured or adhesive surfaces in the region where the pick is held. Although these modifications can be effective, a musician can still easily lose a pick while playing.

Likewise maintaining a secure grip on other types of tools can also be important. For example, surgeons must be able to handle precision instruments while wearing gloves. An improved gripping surface on a writing implement can reduce the pressure required to hold it and alleviate hand fatigue while writing.

What is needed is a surface capable of frictionally engaging a thumb and forefinger to improve grip quality.

DETAILED DESCRIPTION

Figure 1:
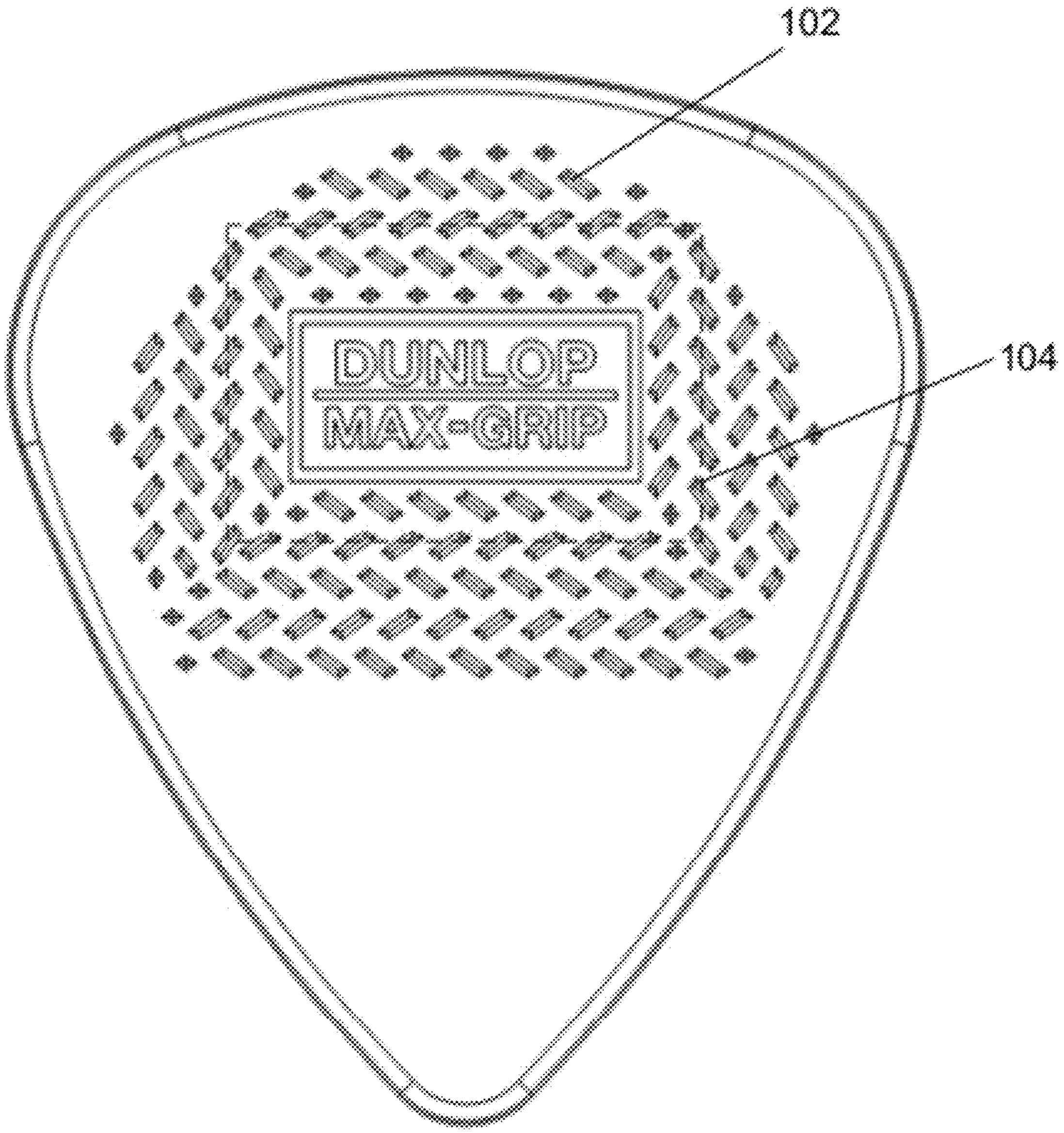
FIG. 1 depicts a planar view of one embodiment of the present device.

In some embodiments, as shown in FIG. 1, a textured surface can include a series of parallel ridges 102, which can be oriented angularly to a linear path transversing said ridges 102.

Figure 1A:
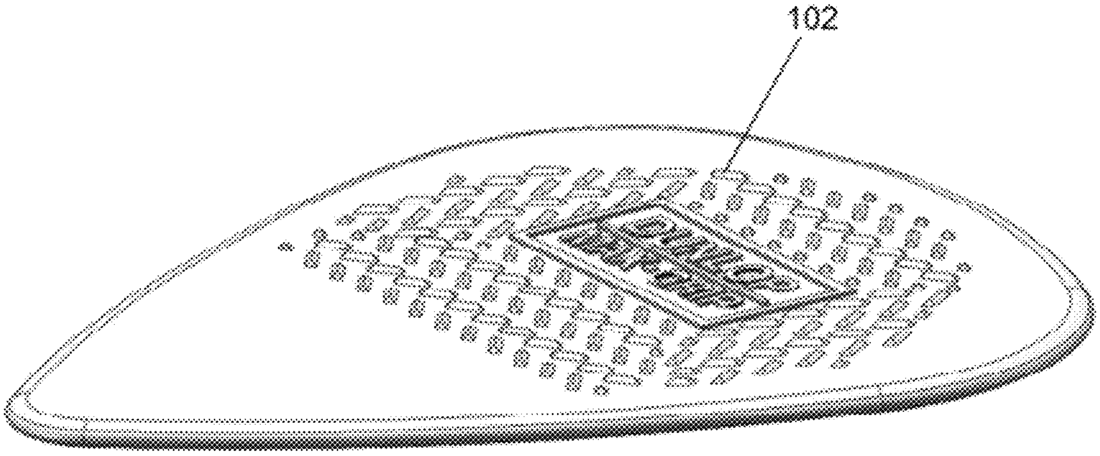
FIG. 1*a* depicts a perspective view of one embodiment of the present device.
Figure 1B:
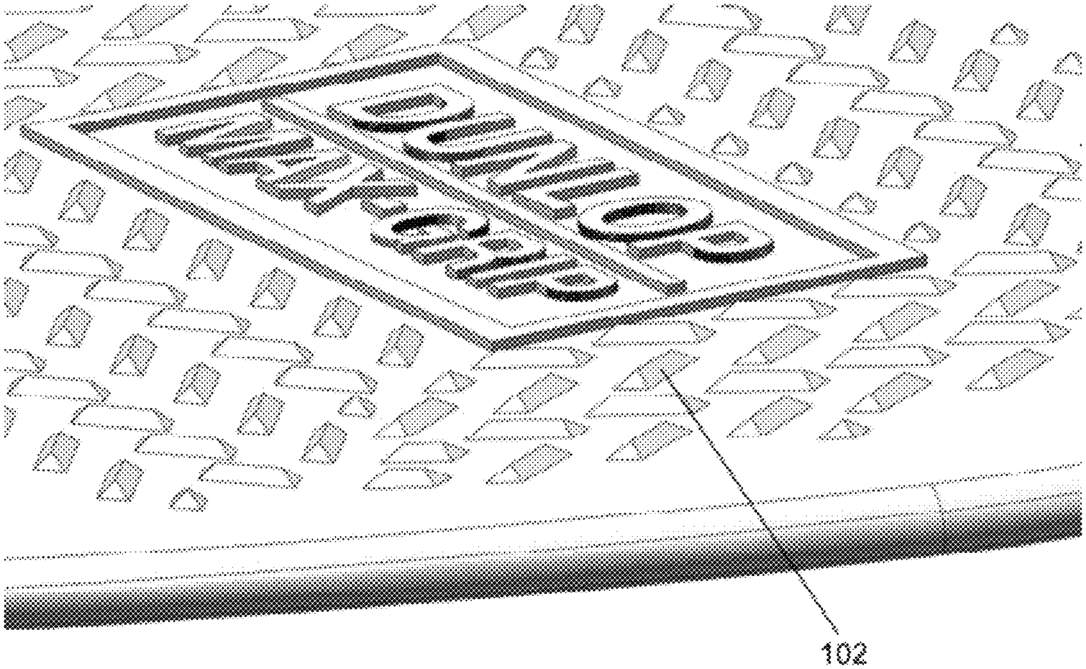
FIG. 1*b* depicts a detail perspective view of one embodiment of the present device applied to a surface of a plectrum.
Figure 1C:
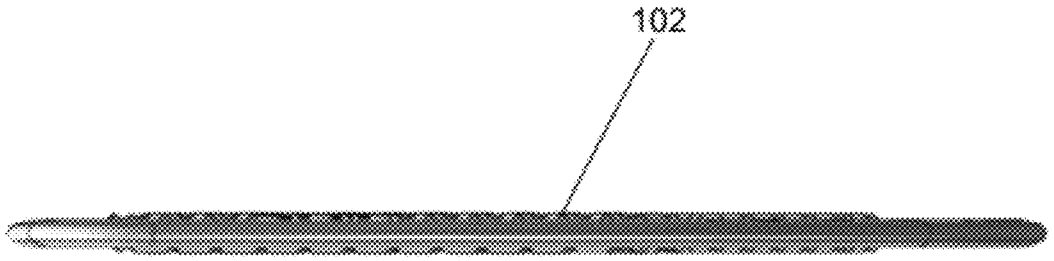
FIG. 1*c* depicts a top edge view of one embodiment of the present device applied to a surface of a plectrum.
Figure 1D:
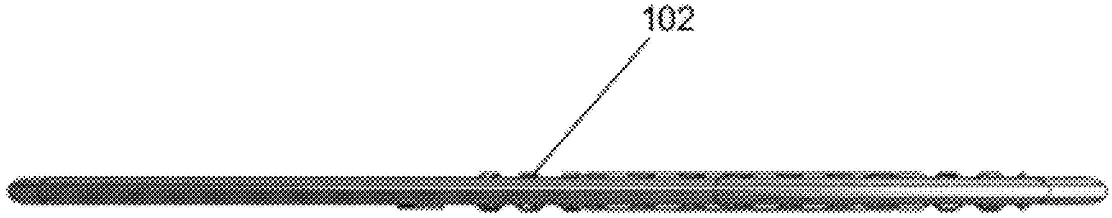
FIG. 1*d* depicts a side edge view of one embodiment of the present device applied to a surface of a plectrum.
Figure 1E:
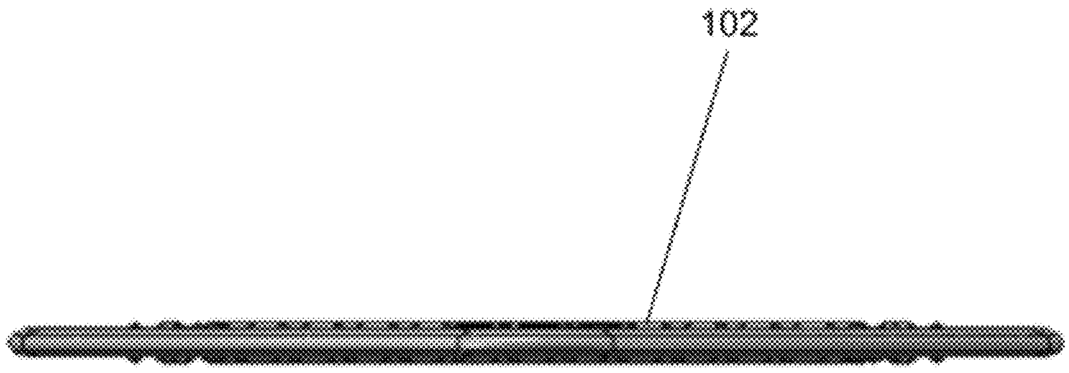
FIG. 1*e* depicts a bottom edge view of one embodiment of the present device applied to a surface of a plectrum.

In some embodiments, as shown in FIG. 1*a* and 1*b*, ridges 102 can have a prismoidal geometry, with a substantially triangular cross-section and a substantially rectangular base. Other ridges 102 in the pattern can have a substantially pyramidal, square-based geometry. However, in other embodiments ridges 102 can have a cross-section and base shape of any known and/or convenient geometry.

The angle of inclination of the sides of ridges can be within the range of 30-45 degrees, or any specified angle in this range with a tolerance of ±3-4 degrees, such as substantially 41.5 degrees, or any other known and/or convenient angle. Further, each ridge 102 can be linearly sloped at each end. In some embodiments, the angle of this slope can be within the range of approximately 30-45 degrees, or any specified angle in this range with a tolerance of ±3-4 degrees, such as substantially 45 degrees, but in other embodiments can be sloped at any other known and/or convenient angle.

In some embodiments, ridges 102 can each have a length in the range of approximately 0.015 in. to 0.050 in, or any specified length in this range with a tolerance of ±0.005 in., such as substantially 0.045 in. Ridges 102 can each have a width in the range of approximately 0.010 in. to 0.020 in., or any specified length in this range with a tolerance of ±0.005 in., such as substantially 0.015 in. Ridges 102 can have a height in the range of approximately 0.004 to 0.014 in, or any specified length in this range with a tolerance of ±0.005 in., such as substantially 0.007 in. In other embodiments, ridges 102 can have lengths, widths, and heights of any other known and/or convenient amount. As shown in FIG. 1, most or all of ridges 102 can be of uniform dimensions, but in other embodiments ridges 102 can have varying dimensions.

In some embodiments, ridges 102 can be spaced horizontally in the range of approximately 0.040 in. to 0.070 in., or any specified length in this range with a tolerance of ±0.005 in., such as substantially 0.056 in, and spaced vertically in the range of approximately 0.040 in to 0.070 in., or any specified length in this range with a tolerance of ±0.005 in., such as substantially 0.048 in., or and any known and/or convenient horizontal or vertical spacing distance.

Figure 2:
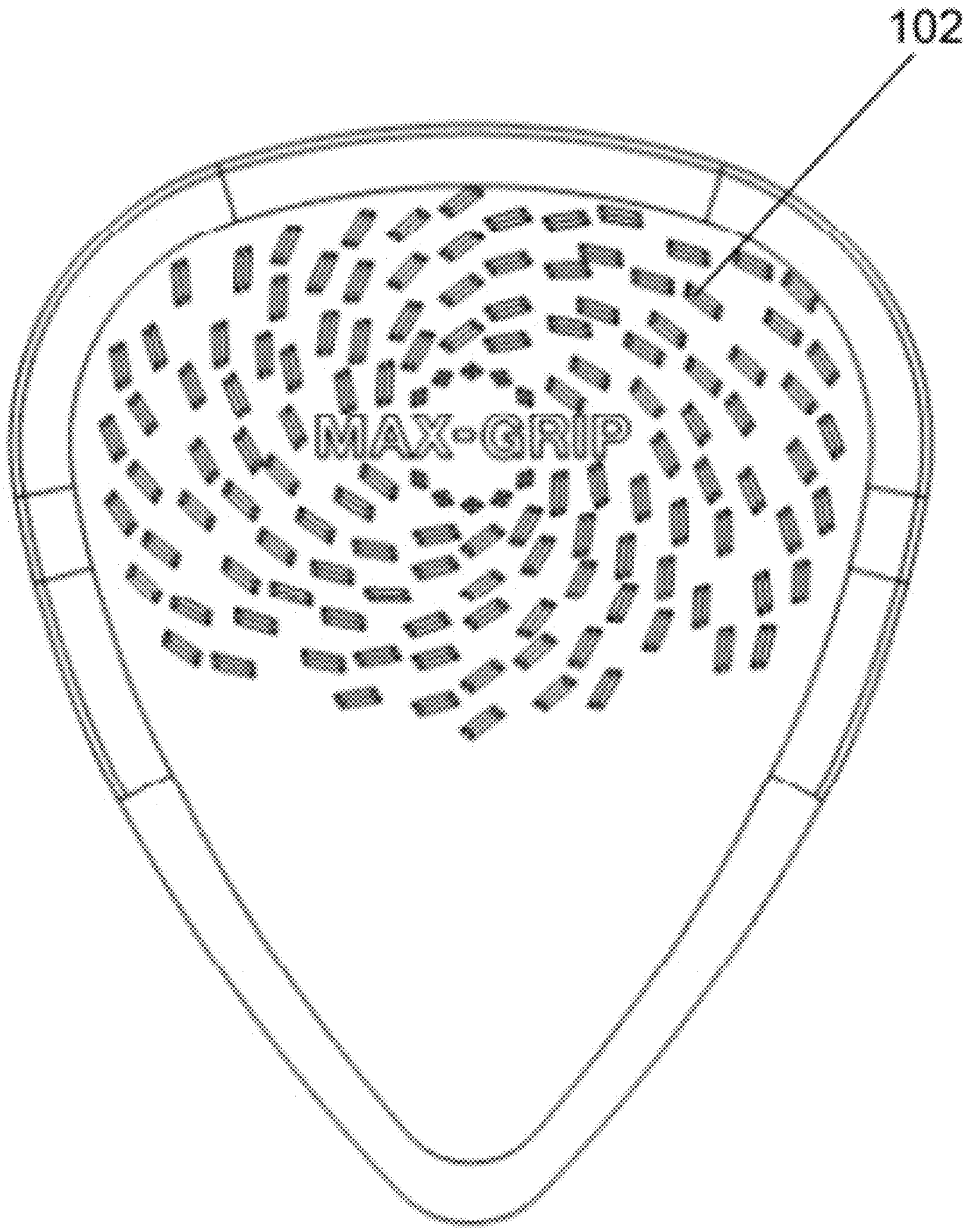
FIG. 2 depicts a planar view of another embodiment of the present device applied to a surface of a plectrum.
Figure 3:
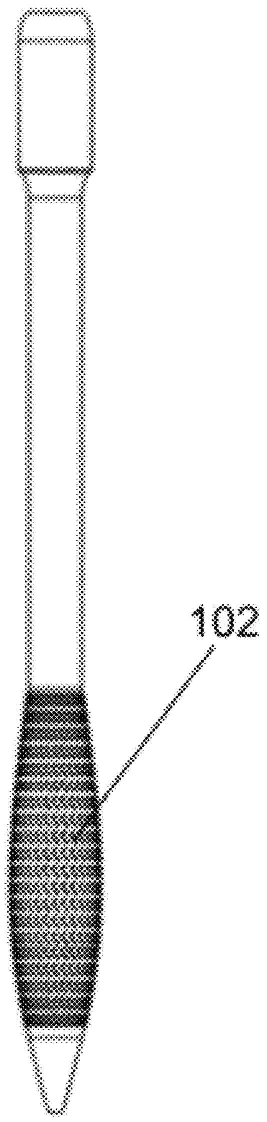
FIG. 3 depicts a planar view of another embodiment of the present device applied to a hand-held implement.
Figure 3A:
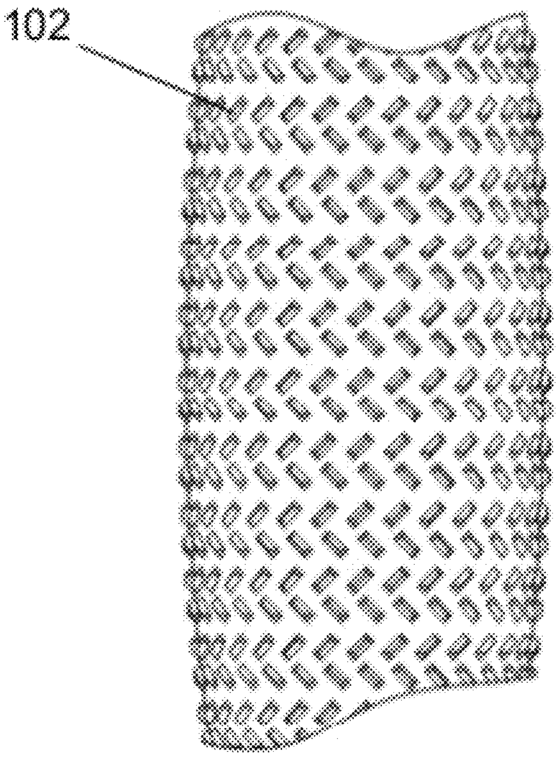
FIG. 3*a* depicts a detail view of the embodiment shown in FIG. 3.

As shown in FIG. 1, a linear path can be divided into segments that can form a plurality of substantially concentric polygons 104 which can be substantially quadrilateral or substantially circular in shape. In other embodiments, as shown in FIG. 2, a linear path can follow a spiral pattern, which can also form a plurality of substantially concentric polygons 104. Ridges 102 in adjacent polygons 104 can be angled in a substantially opposite orientation relative to each other. The angle of this opposite orientation between ridges 102 can be in the range of approximately 60 degrees to 90 degrees, or any specified angle in this range with a tolerance of ±3-4 degrees, such as substantially 70 degrees, or any other known and/or convenient angle.

Each ridge 102 can be oriented at an angle in the range of approximately 30-45 degrees, or any specified angle in this range with a tolerance of ±3-4 degrees such as substantially 35 degrees, or at any other known and/or convenient angle, relative to either a horizontal or vertical reference line. In some embodiments, ridges 102 can be aligned such that a longitudinal midline of a ridge 102 can substantially coincide with the end of another ridge 102 in an adjacent polygon 104. However, in other embodiments, ridges 102 in adjacent polygons 104 can be aligned in any known and/or convenient geometry.

In some embodiments, the present surface can be integrated with or affixed to a plectrum to improve grip. In such embodiments, the present surface can be located in the region of the plectrum that would be held between a thumb and forefinger, and can be on either one or both surfaces of a plectrum. In some embodiments, as shown in FIG. 1, the present surface can have a substantially rectangular area, which can be truncated to conform to the shape of a plectrum. In other embodiments, the present surface can have an area of any other known and/or convenient geometry. Further, a logo, text, or any other known and/or convenient graphic can be located substantially in the center of the present surface or ant any other known and/or convenient location.

In other embodiments, as shown in FIG. 2, the present surface can be affixed to or integrated with a variety of devices, such as, but not limited to, writing implements, hand tools, cooking tools, and surgical instruments. The present surface can also be integrated with an adhesive layer so that it can be affixed to other surfaces.

In use, such as with a plectrum, a user grasps a plectrum between a thumb and forefinger such that the pad of a thumb contacts one surface, and the pad or edge of a forefinger contacts the opposite surface. As a user applies pressure, ridges 102 engage the surfaces of a thumb and forefinger. A first ridge 102 that is substantially aligned with a force applied to the parallel to a surface of a plectrum can slide a thumb or forefinger such that a thumb or forefinger applies a lateral force to the side of a ridge 102 in an adjoining polygon 104 that is oriented at an angle relative to the first ridge 102 to hold the plectrum in place. A plurality of ridges 102 can create several multi-directional lateral forces on the sides of ridges 102 that "lock" a plectrum into a thumb/forefinger grasp.

Although the method has been described in conjunction with specific embodiments thereof, it is evident that many alternatives, modifications and variations will be apparent to those skilled in the art. Accordingly, the method as described and hereinafter claimed is intended to embrace all such alternatives, modifications and variations that fall within the spirit and broad scope of the appended claims.

What is claimed is:

1. A textured surface, comprising:

a plurality of parallel ridges, wherein each ridge is oriented at approximately 35 degrees relative to one of a plurality of linear paths traversing said ridges;

wherein said plurality of linear paths form a plurality of substantially concentric quadrilaterals such that said ridges in adjacent quadrilaterals are angled at approximately 70 degrees relative to each other and are aligned such that a midline of a first ridge coincides substantially with an end of another ridge in an adjacent quadrilateral;

wherein each of said ridges has a substantially prismoidal geometry comprising two quadrilateral sides that meet at the top midline of said ridge, and two triangular sloped ends.

2. The textured surface of claim 1, wherein said surface is integrated with at least one surface of a plectrum.

3. The textured surface of claim 1, wherein said surface is integrated with at least one surface of a device selected from the group consisting of: writing implements, hand tools, cooking tools, and surgical instruments.

4. The textured surface of claim 1, wherein said surface is integrated with an adhesive layer.

5. The textured surface of claim 1, wherein the angle of inclination of said quadrilateral sides is approximately 41.5 degrees, and the angle of inclination of said triangular sloped ends is approximately 45 degrees.

6. A plectrum, comprising:

a surface, and a plurality of parallel ridges coupled with said surface;

wherein each ridge is oriented at approximately 35 degrees relative to one of a plurality of linear paths traversing said ridges, and wherein said plurality of linear paths form a plurality of substantially concentric quadrilaterals such that said ridges in adjacent quadrilaterals are angled at approximately 70 degrees relative to each other and are aligned such that a midline of a first ridge coincides substantially with an end of another ridge in an adjacent quadrilateral, and wherein each of said ridges has a substantially prismoidal geometry comprising two quadrilateral sides that meet at the top midline of said ridge, and two triangular sloped ends.

7. The plectrum of claim 6, wherein the angle of inclination of said quadrilateral sides is approximately 41.5 degrees, and the angle of inclination of said triangular sloped ends is approximately 45 degrees.

* * * * *